US012705946B2

(12) United States Patent
Deaton et al.

(10) Patent No.: US 12,705,946 B2
(45) Date of Patent: Aug. 11, 2026

(54) AUTOMATED SIDE OPENING DOOR FOR A REFRIGERATED ENCLOSURE OF A VENDING MACHINE

(71) Applicant: AUTOMATED RETAIL TECHNOLOGIES, LLC, Sarasota, FL (US)

(72) Inventors: James Edward Deaton, Georgetown, TX (US); Linda H. Wu, Newberg, OR (US); John C. Serieka, Chicago, IL (US); Lynn Warren Hamrick, Leander, TX (US); Sean Raymond Lucas, Leander, TX (US); William Warrenburg, Austin, TX (US); Brent Joseph Clafferty, Round Rock, TX (US)

(73) Assignee: AUTOMATED RETAIL TECHNOLOGIES, LLC, Sarasota, FL (US)

( * ) Notice: Subject to any disclaimer, the term of this patent is extended or adjusted under 35 U.S.C. 154(b) by 88 days.

(21) Appl. No.: 18/785,669

(22) Filed: Jul. 26, 2024

(65) Prior Publication Data

US 2024/0386770 A1 Nov. 21, 2024

Related U.S. Application Data

(63) Continuation of application No. 16/964,697, filed as application No. PCT/US2019/015986 on Jan. 31, 2019, now Pat. No. 12,051,308.

(Continued)

(51) Int. Cl.
*G07F 9/10* (2006.01)
*G07F 17/00* (2006.01)

(52) U.S. Cl.
CPC .......... *G07F 9/105* (2013.01); *G07F 17/0078* (2013.01)

(58) Field of Classification Search
CPC ........ G07F 9/105; G07F 17/0078; G07F 9/10; F24C 7/00; F24C 15/00; H05B 6/808;
(Continued)

(56) References Cited

U.S. PATENT DOCUMENTS 2,649,300 A 8/1953 Launder
4,046,438 A 9/1977 Benasutti et al.
(Continued)

FOREIGN PATENT DOCUMENTS

JP 2004169469 A 6/2004
JP 2005048363 A 2/2005
WO 9633477 A2 10/1996

*Primary Examiner* — Hanh V Tran
(74) *Attorney, Agent, or Firm* — Jason A. Smith; Shumaker, Loop & Kendrick, LLP

(57) ABSTRACT

A vending machine includes a refrigerated enclosure including a housing for storage of an associated pre-packaged food product. The housing has a sidewall with a sidewall opening. A door is mounted to the sidewall for closing and opening the sidewall opening. A drive mechanism is operably connected to the door and adapted to mechanically move the door between a closed position and an opened position. The drive mechanism includes at least one sensing device adapted to determine whether the door is in one of the closed position and the opened position. A door rail is mounted to the sidewall and has a guide track. The door is movably received in the guide track.

15 Claims, 9 Drawing Sheets

Related U.S. Application Data

(60) Provisional application No. 62/625,538, filed on Feb. 2, 2018.

(58) Field of Classification Search
CPC ............ E05D 15/1042; E05D 15/1065; E05D 2015/1055
See application file for complete search history.

(56) References Cited

U.S. PATENT DOCUMENTS

| | | | |
|---|---|---|---|
| 4,079,919 | A | 3/1978 | Schober et al. |
| 4,080,756 | A | 3/1978 | Heaney |
| 4,616,123 | A | 10/1986 | Zagoroff |
| 4,677,278 | A | 6/1987 | Knoll |
| 5,147,994 | A | 9/1992 | Smith et al. |
| 5,168,795 | A | 12/1992 | Okada |
| 5,263,280 | A | 11/1993 | Dilcher |
| 5,503,300 | A | 4/1996 | Prescott et al. |
| 5,799,822 | A | 9/1998 | Rudewicz et al. |
| 6,497,072 | B2 | 12/2002 | Fries |
| 6,518,553 | B1 | 2/2003 | Leykin et al. |
| 6,713,741 | B2 | 3/2004 | Miller |
| 6,802,433 | B2 | 10/2004 | Leykin et al. |
| 7,137,529 | B2 | 11/2006 | Martinelli et al. |
| 2002/0053166 | A1 | 5/2002 | Fries |
| 2002/0088800 | A1 | 7/2002 | Miller |
| 2007/0277454 | A1 | 12/2007 | Box |
| 2009/0217595 | A1 | 9/2009 | Grimm et al. |
| 2012/0116577 | A1 | 5/2012 | Ottomanelli |

AUTOMATED SIDE OPENING DOOR FOR A REFRIGERATED ENCLOSURE OF A VENDING MACHINE

BACKGROUND

Automatic food dispensers or vending machines for dispensing pre-packaged food products are well known. Typically, the vending machine includes a cabinet or housing having mounted therein at least one refrigerated enclosure that includes passages or compartments for storing pre-packaged food products to be dispensed. The vending machine can further be provided with an oven and a conveying system operable to remove one of the food products from the refrigerated enclosure and position the food product within the oven for heating/cooking. The present disclosure relates to an automated side opening door for the refrigerated enclosure.

SUMMARY

According to one aspect, a vending machine comprises a refrigerated enclosure including a housing for storage of an associated pre-packaged food product. The housing has a sidewall with a sidewall opening. A door is mounted to the sidewall for closing and opening the sidewall opening. A drive mechanism is operably connected to the door and adapted to mechanically move the door between a closed position and an opened position. The drive mechanism includes at least one sensing device adapted to determine whether the door is in one of the closed position and the opened position. A door rail is mounted to the sidewall and has a guide track. The door is movably received in the guide track.

According to another aspect, a drive mechanism for automatically moving a door provided on a sidewall of a refrigerated enclosure between a closed position and an opened position is provided. The drive mechanism comprises a mount secured to the door and an actuator operably to move the door. The actuator includes a motor and a rod operably coupled to the motor and pivotally connected to the mount. A first sensing device is operably connected to the actuator and adapted to detect the door in the opened position and deactivate the actuator in the opened position of the door. A second sensing device is operably connected to the actuator and adapted to detect the door in the closed position and deactivate the actuator in the closed position of the door.

DETAILED DESCRIPTION

Figure 1:
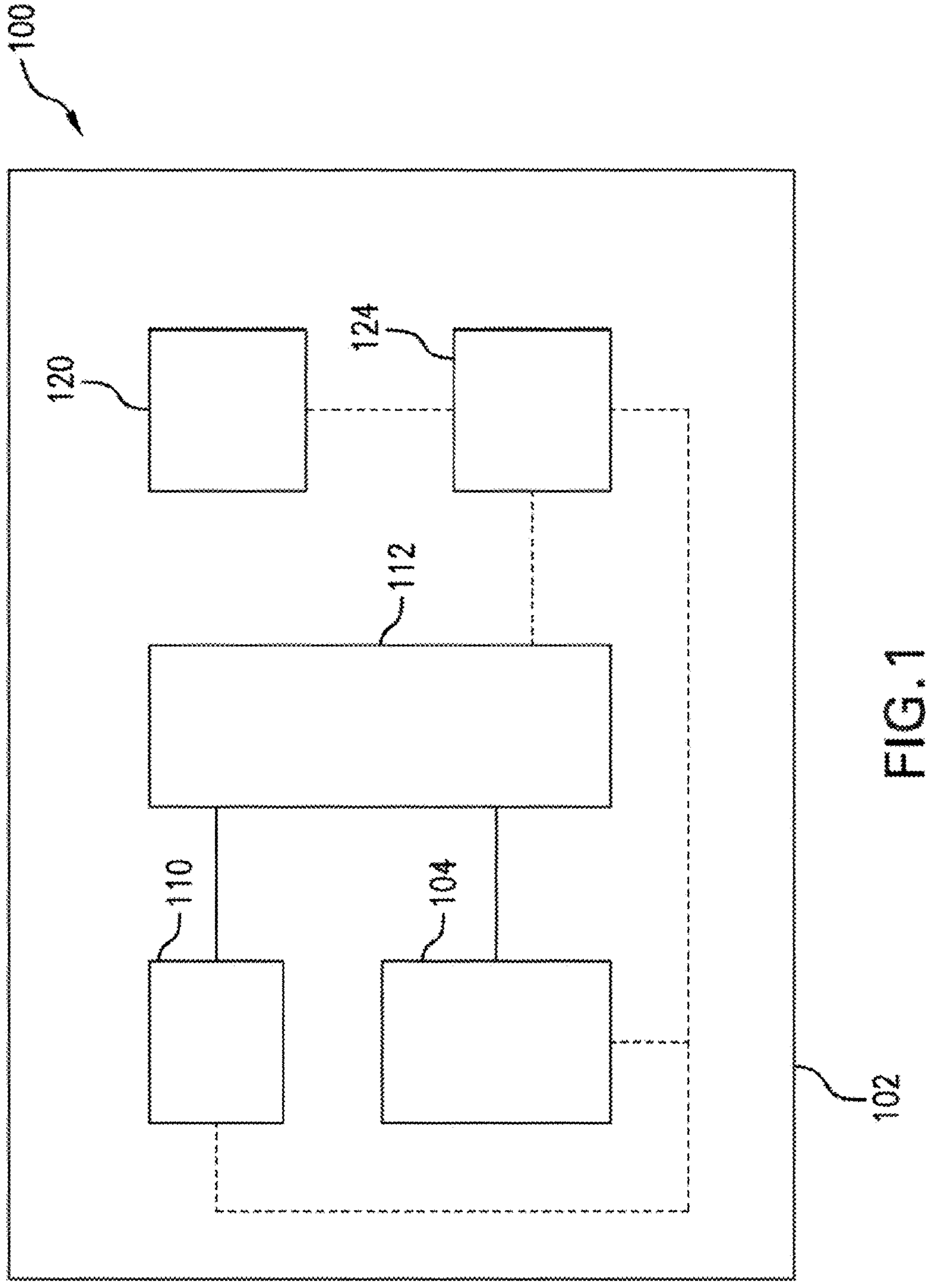
FIG. 1 is a schematic view of a vending machine according to the present disclosure.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 schematically depicts a vending machine 100 according to the present disclosure. The term “vending machine” is used to denote any type of machine that stores products for remote distribution or sale to consumers wherein the consumer transacts business with the vending machine. The vending machine 100 generally includes a cabinet or housing 102 for housing various operational components of the vending machine. The operational components can comprise at least one refrigerated enclosure 104 that includes refrigerated passages or compartments for storing pre-packaged food products to be dispensed, an oven 110 mounted atop the refrigerated enclosure 104 for selectively heating/cooking the pre-packaged food product, and a transfer mechanism 112 (e.g., a conveyor, a robotic arm, and the like) operable to selectively remove one of the pre-packaged food products from the refrigerated enclosure 104 and transfer the food product to the oven 110 for heating/cooking. It should be appreciated that the oven 110 can be a number of different types of ovens, including microwave, radio frequency, infrared, convection, resistive element and combinations of these types. In the depicted aspect, the oven 110 is a microwave oven. The transfer mechanism 112 is further adapted to remove the heated/cooked food product from the oven 110 and transfer the heated/cooked food product to a customer receiving area (not shown) of the vending machine 100.

Figure 2A:
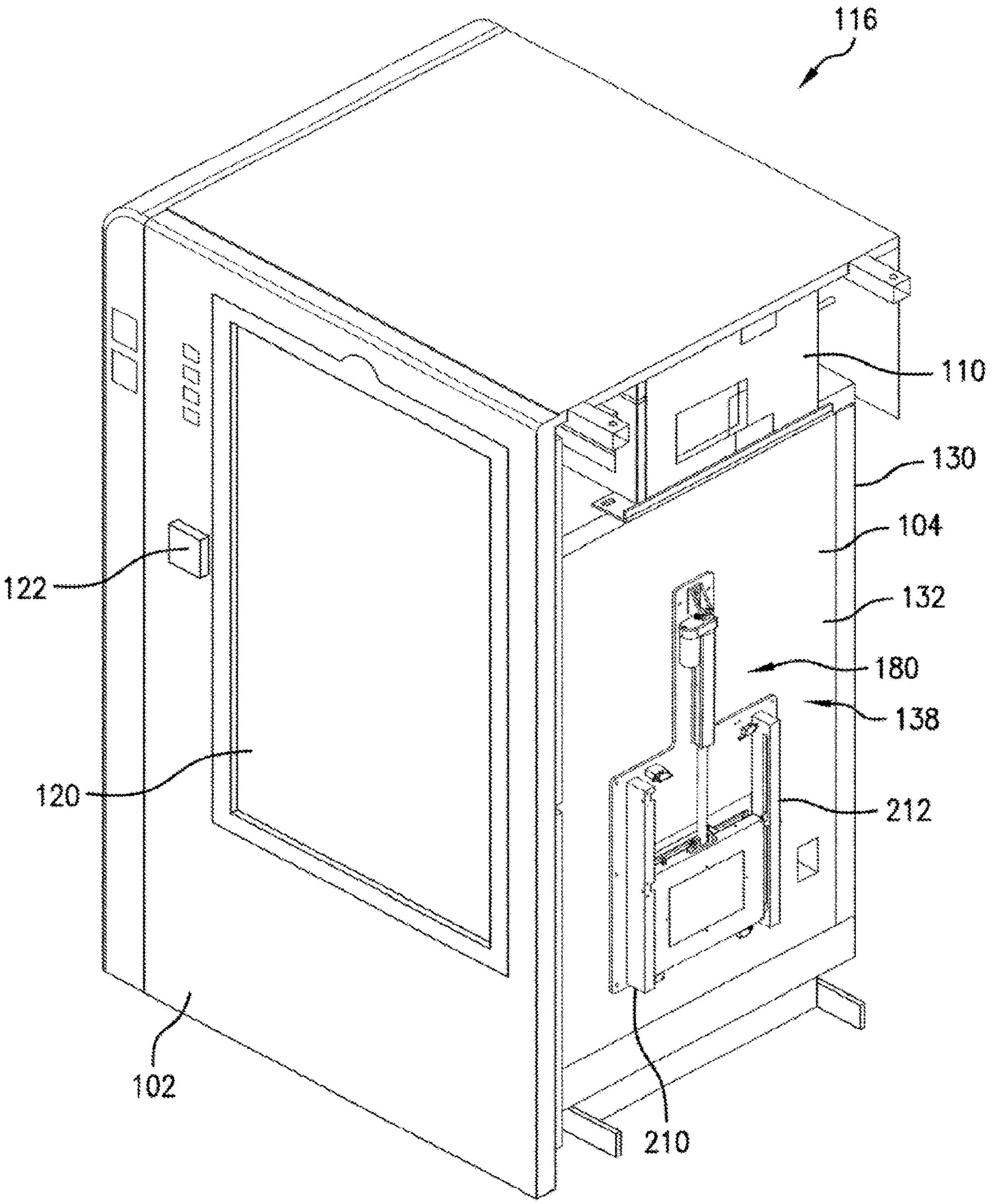
FIG. 2A is a perspective view of an exemplary vending unit of the vending machine, the vending unit including a refrigerated enclosure.

FIG. 2A depicts an exemplary vending unit 116 of the vending machine 100 which houses the refrigerated enclosure 104 and the oven 110. According to one aspect, the vending unit 116 includes a front operational panel 120, which can include a display/touch screen, and optionally a credit/debit card reader 122. The front operational panel 120 and card reader 122 are electronically coupled with a central processing unit (CPU) 124 for automated operation of the vending machine 100 (see FIG. 1). Depictions of the pre-packaged food products available for selection/purchase optionally are viewable on the front operational panel 120 and can be selected, for example, by entering a code on a keypad depicted on the front operational panel 120. The CPU 124 can include a processing module configured to verify receipt of payment for the selected food product, generate a transfer signal for the transfer mechanism 112 to retrieve the selected food product from the refrigerated enclosure 104 and deliver the selected food product to the oven 110, generate a cooking signal that selectively operates the oven 110 based on the selected food product, and generate a dispensing signal for the transfer mechanism 112 to retrieve the heated/cooked food product from the oven 110 and deliver the heated/cooked food product to the customer receiving area of the vending machine 100. The basic operation of the vending machine 100 is well understood, and a further detailed explanation thereof is not necessary for an understanding of the present invention.

Figure 2B:
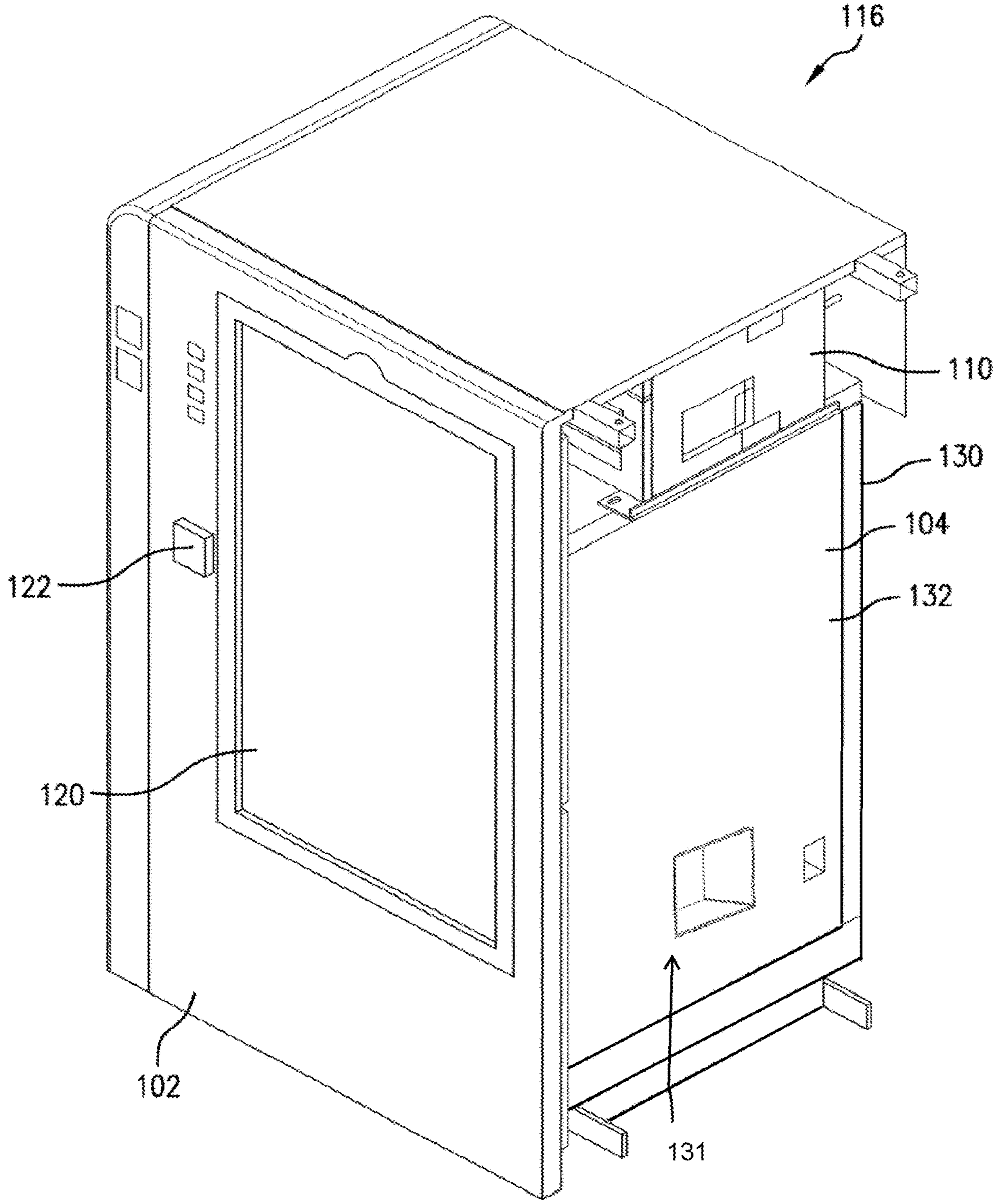
FIG. 2B is a perspective view of an exemplary vending unit of the vending machine, according to one aspect of the present disclosure.
Figure 3:
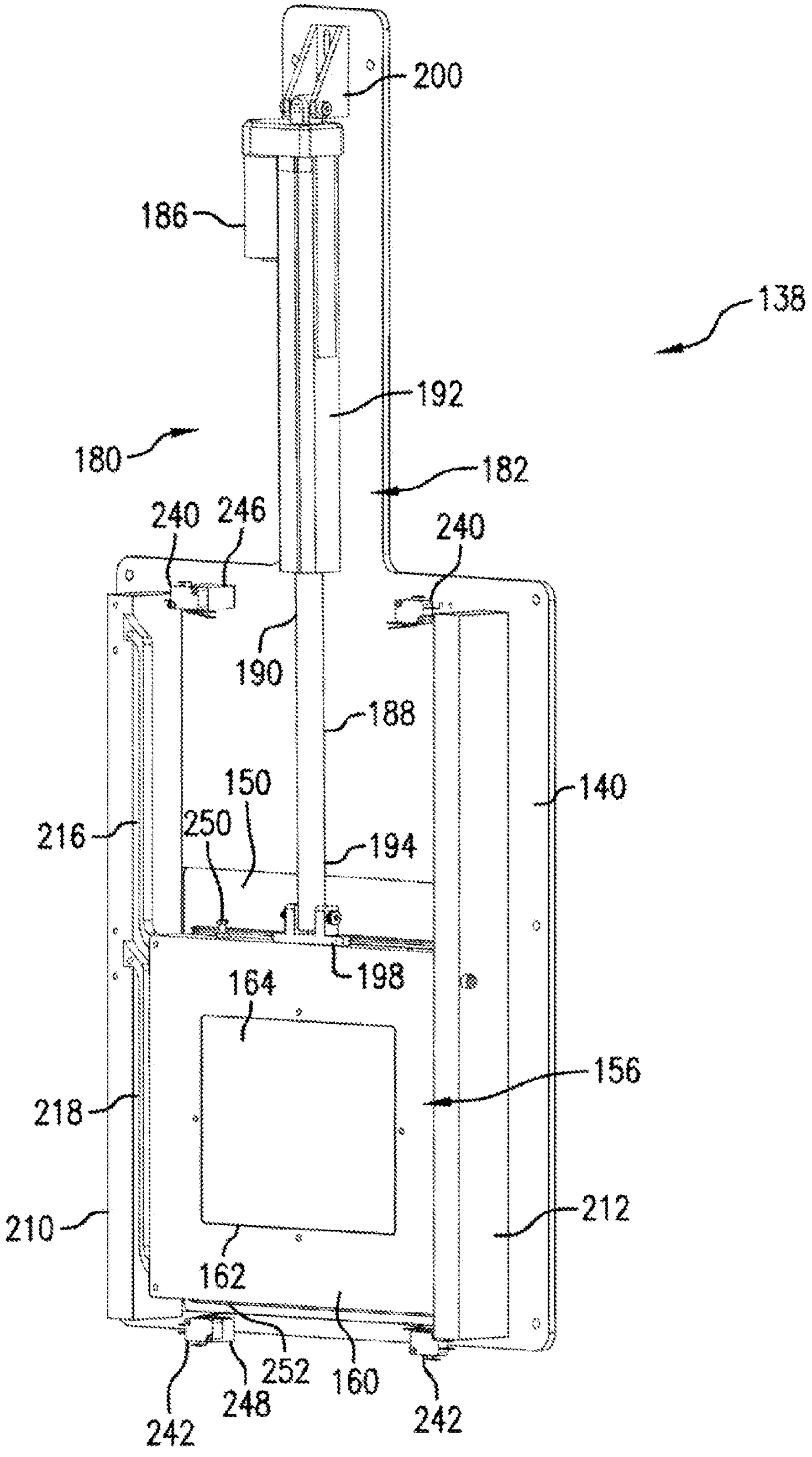
FIG. 3 is a perspective view of an exemplary door assembly for the refrigerated enclosure according to one aspect of the present disclosure.
Figure 4:
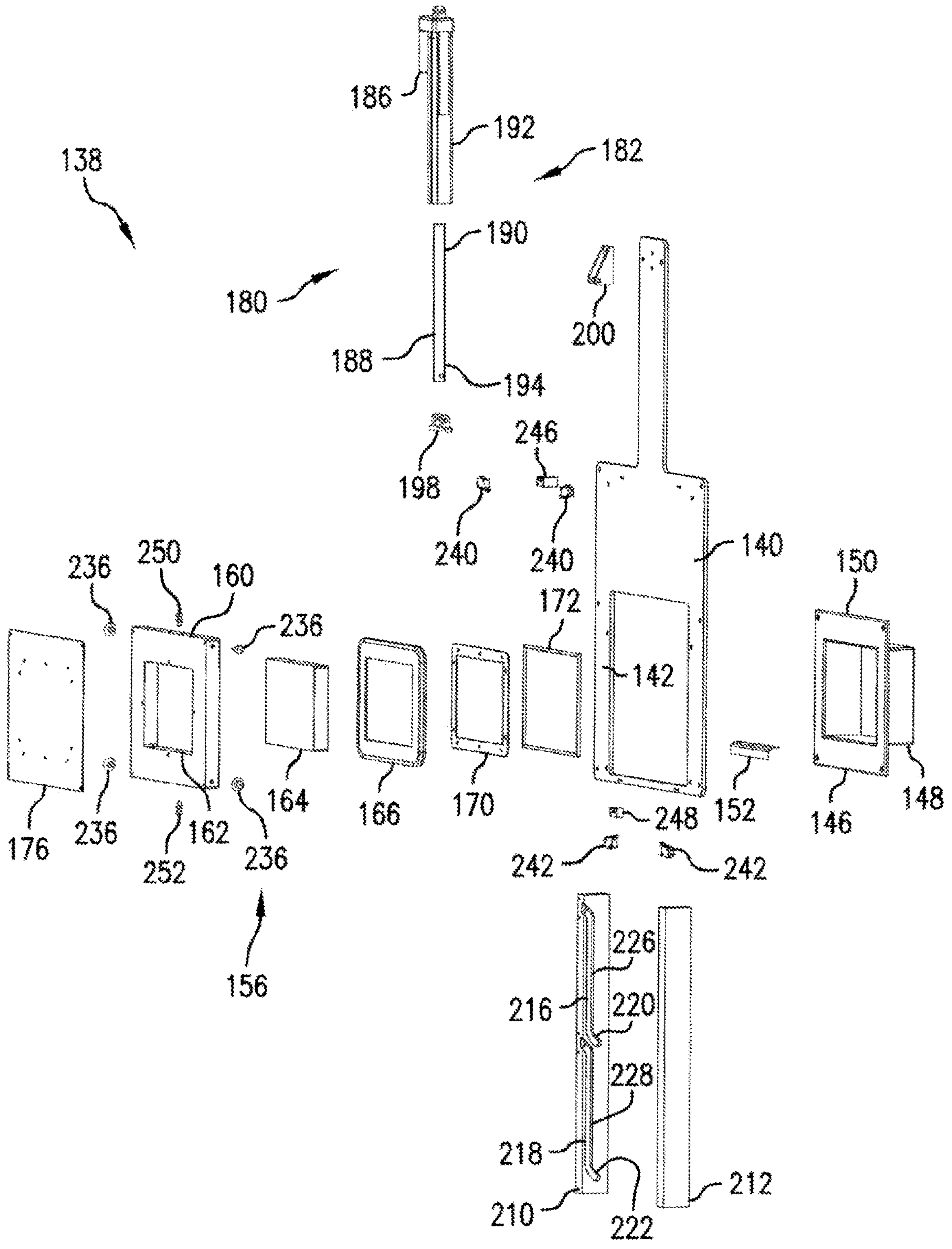
FIGS. 4 and 5 are exploded perspective view of the door assembly of FIG. 3.
Figure 5:
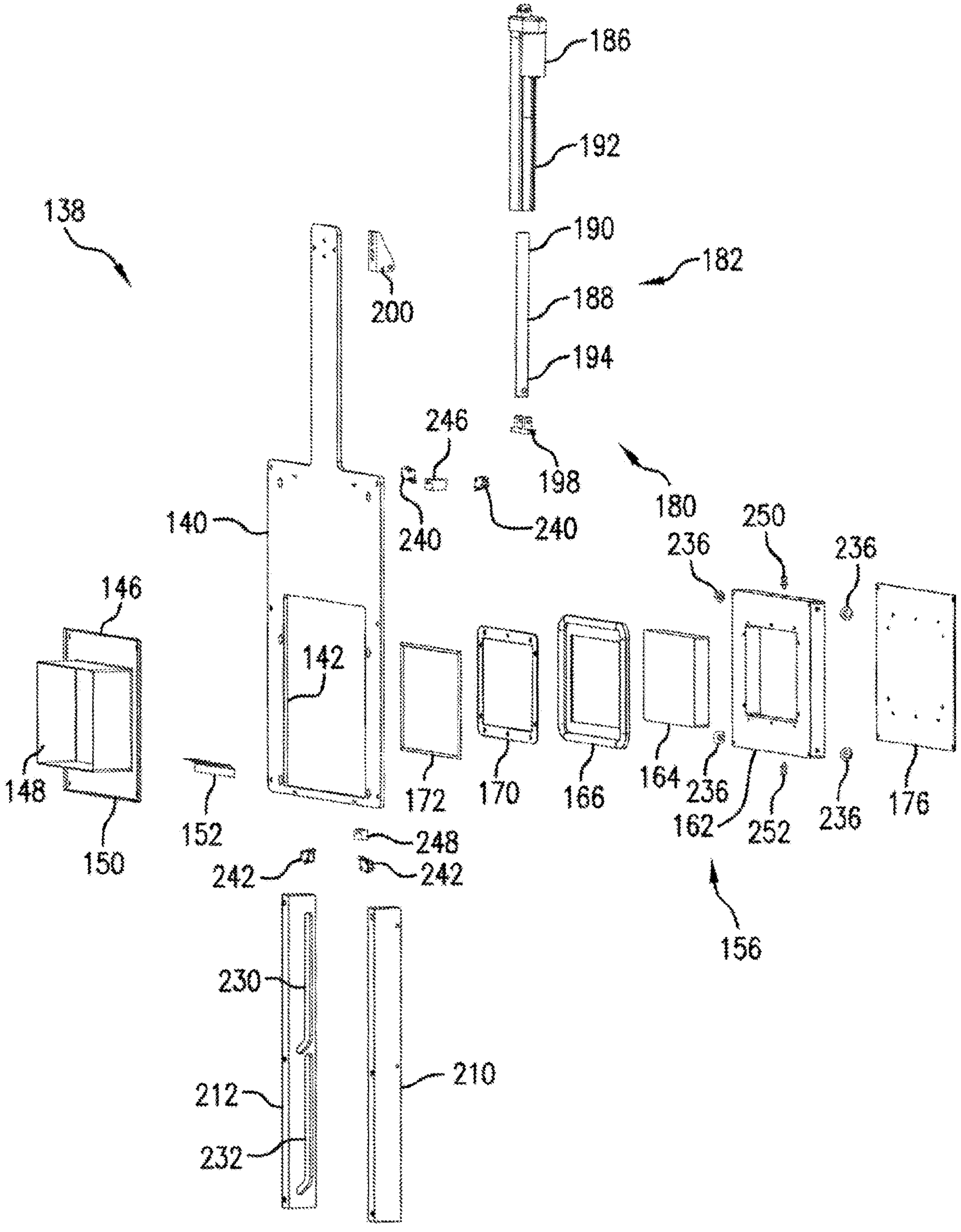

With continued reference to FIG. 2A, the refrigerated enclosure 104 includes a housing 130 for storage of the pre-packaged food products. The housing 130 includes a sidewall 132 exposed to the transfer mechanism 112, the sidewall 132 provided with a sidewall opening 131 (see FIG. 2B) sized to allow ingress and egress of the transfer mechanism 112. A door assembly 138 according to one aspect of the present disclosure is mounted to the sidewall 132 for selectively covering the sidewall opening 131 (see FIG. 2B). With particular reference to FIGS. 3-5, the door assembly includes a mounting plate 140 attached to the sidewall 132 and having an opening 142 extending therethrough, the opening 142 is aligned with the sidewall opening 131 (see FIG. 2B). A pass through member 146 is positioned in both the plate opening 142 and the sidewall opening 131 (see FIG. 2B). The pass through member includes a conduit or duct 148 extending from a mounting flange 150 that is fastened to the mounting plate 140. A foil tape 152 can be applied to a lower part of the pass through member 146. A door 156, which can be rectangular shaped, is mounted to the sidewall 132, more particularly the mounting plate 140, for closing and opening the sidewall opening 131 (see FIG. 2B). In the depicted aspect, the door 156 includes a door frame 160 defining an aperture 162. The aperture 162 is sized to receive an insulation member 164, and when properly positioned in the aperture 162, the door frame 160 surrounds the insulation member 164 with the exposed surfaces of the insulation member 164 coplanar with outer and inner side surfaces of the door frame 160. A compressible seal member 166, for example a silicone foam seal member, is attached to the door frame 160 via a gasket plate 170. Each of the seal member 166 and the gasket plate 170 is shaped to extend about a periphery of the duct 148. A heater 172 can be mounted to the gasket plate 170. Further, an outer cover 176 can be secured to the outer side surface of the door frame 160. Additionally, an inner cover (not shown) can be secured to the inner side surface of the door frame 160. If so provided, the seal member 166 and the gasket plate 170 are mounted to the inner cover.

A drive mechanism 180 is operably connected to the door 156 and adapted to mechanically move the door between a closed position and an opened position. In the depicted aspect, the drive mechanism includes an actuator 182 secured to the mounting plate 140 and coupled the door 156. The actuator 182 includes a motor 186 and a rod 188 driven by the motor. The rod 188 has a first end portion 190 coupled to the motor 186 via a sleeve 192 and a second end portion 194 coupled to the door 156. The sleeve 192 adapted to telescopically receive therein the rod 188, and as depicted the motor 186 is connected to the sleeve. Accordingly, actuation of the motor 186 moves the rod 188 within the sleeve 192, and, in turn, moves the door 156. Further, the door 156 is pivotally connected to the second end portion 194 of the rod 188 via a mount or lower clevis 198 secured to the door frame 160. A mounting bracket or upper clevis 200 is provided to mount the sleeve 192 together with the motor 186 to the mounting plate 140.

The door 156 can be guided, for example, in a pair of guide rails 210, 212 attached to the mounting plate 140 flanking the plate opening 142. The guide rail 210 includes at least one guide track formed therein for guiding movement of the door 156. In the depicted aspect, the guide rail 210 includes an upper or first guide track 216 and a lower of second guide track 218. Each guide track 216, 218 is adapted to first move the door 156 in a first direction outwardly of the housing sidewall 132 of the refrigerated enclosure 104 (allowed for by the pivotal connection between the door 156 and the rod 188) and then move the door in a second direction along the housing sidewall 132 to the opened position. To this end, each guide track 216, 218 is generally L-shaped with a respective first section 220, 222 oriented diagonally relative to the housing sidewall 132 and a respective second section 226, 228 extending from the first section in a plane parallel to the housing sidewall 132. It should be appreciated that the guide rail 212 is similarly constructed and includes an upper or first guide track 230 and a lower of second guide track 232. Track rollers 236 are mounted to the door frame 160 and are received in the guide tracks of the respective guide rails 210, 212. The door 156 is movable in the guide tracks of the respective guide rails 210, 212 in a height direction of the vending unit 116 (see FIG. 2A). Although, it should be appreciated that the guide rails 210, 212 can be arranged so that the door 156 is movable in a width direction of the vending unit 116. Further, the door 156 is in direct engagement with the pass through member 146 in the closed position, with the seal member 166 sealingly engaging the mounting flange 150.

The exemplary drive mechanism 180 further includes at least one sensing device adapted to determine whether the door 156 is in one of the closed position and the opened position. The at least one sensing device can be in communication with the CPU 124, which, in turn, allows for operation of the transfer mechanism 112 when the door 156 is in the opened position. In the depicted embodiment, the at least one sensing device is a first sensing device 240 operably connected to the actuator 182 and adapted to detect the door 156 in the opened position, and the drive mechanism 180 further includes a second sensing device 242 operably connected to the actuator 182 and adapted to detect the door 156 in the closed position. According to the present embodiment, the first sensing device 240, which can be a first micro-switch, can mounted to the mounting plate 140 by an upper switch mount 246 fastened to the mounting plate. The second sensing device 242, which can be a second micro-switch, can also mounted to the mounting plate 140 by a lower switch mount 248 fastened to the mounting plate. The first and second sensing devices 240, 242 are positioned such that the first sensing device 240 is actuated by an upper pin 250 secured to the door frame 160 in the opened position of the door 156 and the second sensing device 242 is actuated by a lower pin 252 secured to the door frame 160 in the closed position of the door 156. It should be appreciated that actuation of either of the first and second sensing devices 240, 242 deactivates the actuator 182. It should also be appreciated that the first and second sensing devices 240, 242 can be in communication with the CPU 124 allowing for proper timing of the transfer mechanism 112 for the removal of the pre-packaged food product from the refrigerated enclosure 104.

Figure 6:
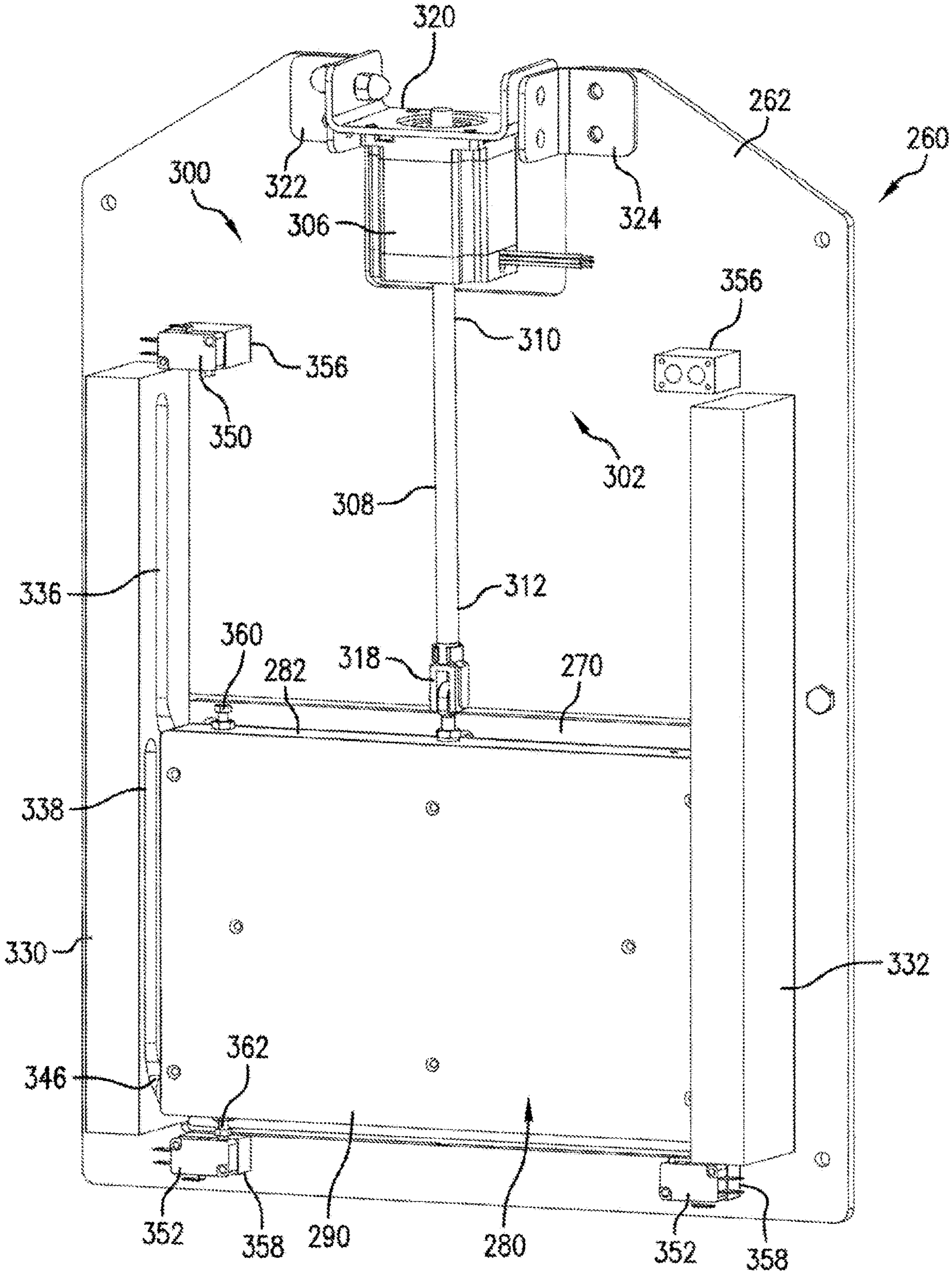
FIG. 6 is a perspective view of an exemplary door assembly for the refrigerated enclosure according to another aspect of the present disclosure.
Figure 7:
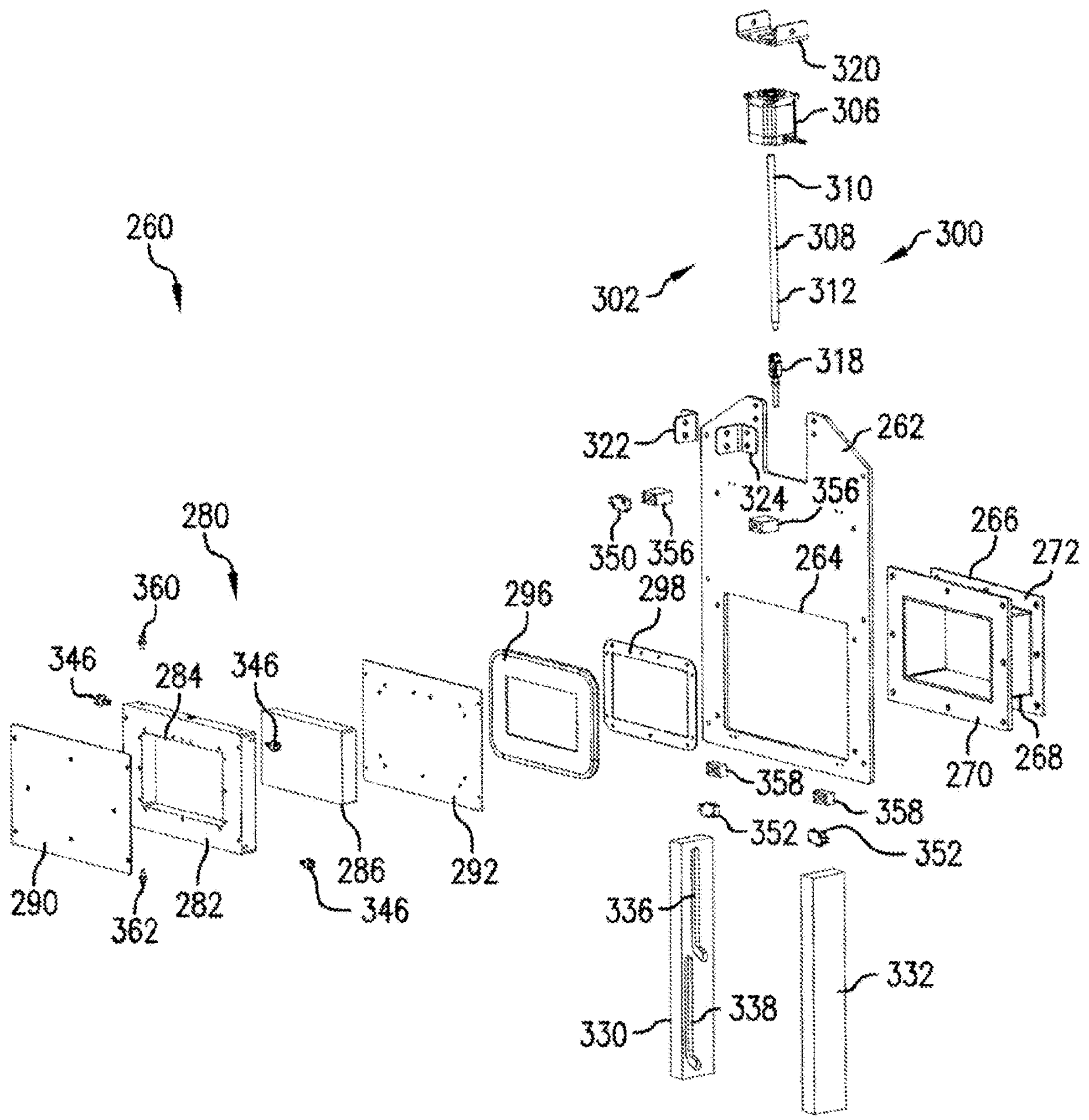
FIGS. 7 and 8 are exploded perspective view of the door assembly of FIG. 6.
Figure 8:
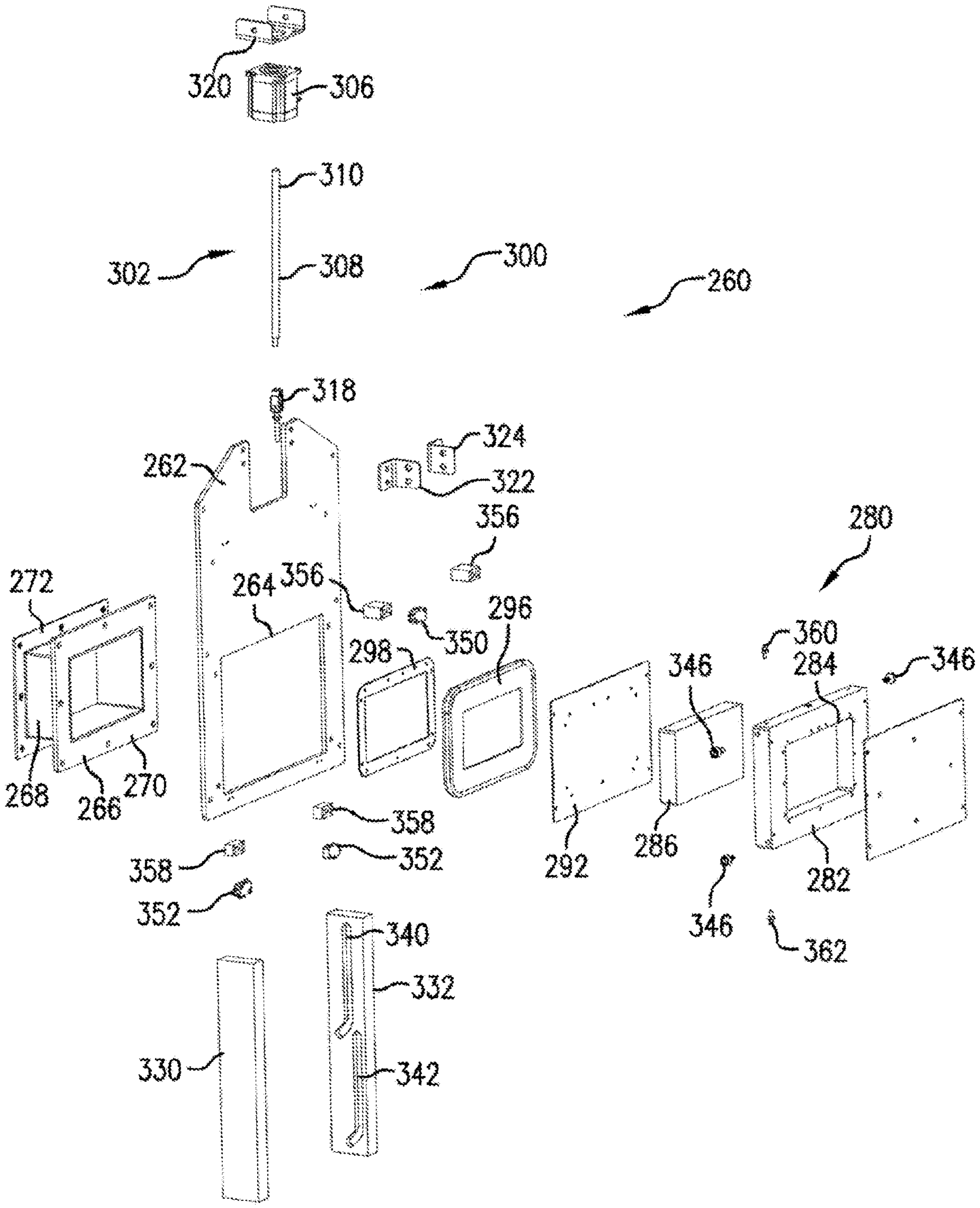

FIGS. 6-8 depict another aspect of a door assembly 260 for mounting to the sidewall 132 of the refrigerated enclosure 104 for selectively covering the sidewall opening. The door assembly 260 includes a mounting plate 262 for attachment to the sidewall 132 and having an opening 264 extending therethrough. A pass through member 266 is positioned in the plate opening 264 and is adapted to extend through the sidewall opening. The pass through member 266 includes a conduit or duct 268 extending between mounting flanges 270, 272. Mounting flange 270 is fastened to the mounting plate 262. A door 280, which can be rectangular shaped, is mounted to the mounting plate 262. In the depicted aspect, the door 280 includes a door frame 282 defining an aperture 284 sized to receive an insulation member 286. Similar to the door 156, when properly positioned in the aperture 284, the door frame 282 surrounds the insulation member 286 with the exposed surfaces of the insulation member 286 coplanar with outer and inner side surfaces of the door frame 282. An outer cover 290 can be secured to the outer side surface of the door frame 282, and an inner cover 292 can be secured to the inner side surface of the door frame. A compressible seal member 296, for example a silicone foam seal member, is attached to the inner cover 292 via a gasket plate 298. Each of the seal member 166 and the gasket plate 170 is shaped to extend about a periphery of the duct 268. A heater (not shown) can be mounted to the gasket plate 298.

A drive mechanism 300 is operably connected to the door 280 and adapted to mechanically move the door between a closed position and an opened position. In the depicted aspect, the drive mechanism 300 includes an actuator 302 secured to the mounting plate 262 and coupled the door 280. The actuator 302 includes a motor 306 and a rod 308 driven by the motor. The rod 308 has a first end portion 310 coupled to the motor 306 and a second end portion 312 pivotally connected to the door 280 via a mount or lower clevis 318 secured to the door frame 282. Mounting brackets 320, 322, 324 mount the motor 306 to the mounting plate 262. In the depicted aspect, the rod 308 is a threaded rod and the motor 306 is adapted to threadingly receive the threaded rod. The threaded rod 308 is movable through the motor 306 as the door 280 is moved between the closed position and opened position.

Similar to the above described door 156, the door 280 can be guided, for example, in a pair of guide rails 330, 332 attached to the mounting plate 262 flanking the plate opening 264. In the depicted aspect, the guide rail 330 includes an upper or first guide track 336 and a lower of second guide track 338. The guide rail 332 also includes an upper or first guide track 340 and a lower of second guide track 342. Each guide track of the respective guide rails 330, 332 is adapted to first move the door 280 in a first direction outwardly of the housing sidewall 132 of the refrigerated enclosure 104 (allowed for by the pivotal connection between the door 280 and the rod 308) and then move the door 280 in a second direction along the housing sidewall 132 to the opened position. To this end, each guide track of the respective guide rails 330, 332 is generally L-shaped. Track rollers 346 are mounted to the door frame 282 and are received in the guide tracks of the respective guide rails 330, 332. Again, the door 280 is movable in the guide tracks of the respective guide rails 330, 332 in a height direction of the vending unit 116. Although, it should be appreciated that the guide rails 330, 332 can be arranged so that the door 280 is movable in a width direction of the vending unit 116. Further, the door 280 is in direct engagement with the pass through member 266 in the closed position, with the seal member 296 sealingly engaging the mounting flange 270.

The exemplary drive mechanism 300 further includes at least one sensing device adapted to determine whether the door 280 is in one of the closed position and the opened position. The at least one sensing device can be in communication with the CPU 124, which, in turn, allows for operation of the transfer mechanism 112 when the door 280 is in the opened position. In the depicted embodiment, the at least one sensing device is a first sensing device 350 operably connected to the actuator 302 and adapted to detect the door 280 in the opened position, and the drive mechanism 180 further includes a second sensing device 352 operably connected to the actuator 302 and adapted to detect the door 280 in the closed position. According to the present embodiment, the first sensing device 350, which can be a first micro-switch, can mounted to the mounting plate 262 by an upper switch mount 356 fastened to the mounting plate. The second sensing device 352, which can be a second micro-switch, can also mounted to the mounting plate 262 by a lower switch mount 358 fastened to the mounting plate. The first and second sensing devices 350, 352 are positioned such that the first sensing device 240 is actuated by an upper pin 360 secured to the door frame 282 in the opened position of the door 280 and the second sensing device 352 is actuated by a lower pin 362 secured to the door frame 282 in the closed position of the door 280. It should be appreciated that actuation of either of the first and second sensing devices 350, 352 deactivates the actuator 302. Again, it should also be appreciated that the first and second sensing devices 350, 352 can be in communication with the CPU 124 allowing for proper timing of the transfer mechanism 112 for the removal of the pre-packaged food product from the refrigerated enclosure 104.

It will be appreciated that various of the above-disclosed features and functions, or alternatives or varieties thereof, may be desirably combined into many other different systems or applications. By way of example, the refrigerated enclosure can be configured to include doors on opposing sidewalls which would allow for the pre-packaged food products to be transferred through the refrigerated enclosure (i.e., inserted though one sidewall and delivered though the other sidewall). The refrigerated enclosure can also be configured to include the door on at least one of the top wall and bottom wall of the refrigerated enclosure. Also that various presently unforeseen or unanticipated alternatives, modifications, variations or improvements therein may be subsequently made by those skilled in the art which are also intended to be encompassed by the following claims.

The invention claimed is:

1. A vending machine comprising:

a refrigerated enclosure including a housing for storage of an associated pre-packaged food product, the housing having a sidewall with a sidewall opening;

a door mounted to the sidewall for closing and opening the sidewall opening, wherein the door includes a door frame defining an aperture, and an insulation member is positioned in the aperture such that the door frame surrounds the insulation member with exposed surfaces of the insulation member coplanar with outer and inner side surfaces of the door frame;

a drive mechanism operably connected to the door and adapted to mechanically move the door between a closed position and an opened position, the drive mechanism including at least one sensing device adapted to determine whether the door is in one of the closed position and the opened position; and a door rail mounted to the sidewall and having a guide track, the door movably received in the guide track.

2. The vending machine of claim 1, wherein the drive mechanism includes an actuator coupled to the door, the actuator includes a motor and a rod having a first end portion coupled to the motor and a second end portion coupled to the door.

3. The vending machine of claim 1, wherein the drive mechanism includes a sleeve adapted to telescopically receive therein the rod, the motor connected to the sleeve.

4. The vending machine of claim 1, wherein the rod is a threaded rod and the motor is adapted to threadingly receive the threaded rod, the threaded rod is movable through the motor as the door is moved between the closed position and opened position.

5. The vending machine of claim 1, wherein the at least one sensing device is a first sensing device operably connected to the actuator and adapted to detect the door in the opened position and deactivate the motor in the opened position, and further including a second sensing device operably connected to the actuator and adapted to detect the door in the closed position and deactivate the motor in the closed position.

6. The vending machine of claim 2, wherein the guide track is adapted to first move the door in a first direction outwardly of the housing sidewall and then move the door in a second direction along the housing sidewall to the opened position.

7. The vending machine of claim 6 wherein the guide track is generally L-shaped with a first section oriented diagonally relative to the housing sidewall and a second section extending from the first section in a plane parallel to the housing sidewall.

8. The vending machine of claim 1, wherein the door is pivotally connected to the second end portion of the rod.

9. The vending machine of claim 1, wherein a plate is mounted to the housing sidewall, the plate including a plate opening aligned with the sidewall opening, and further including a pass through member positioned in both the plate opening and the sidewall opening, the door is in direct engagement with the pass through member in the closed position.

10. The vending machine of claim 9, wherein the door includes a seal member secured to an exterior of the frame, the seal member engaging the pass through member.

11. A drive mechanism for automatically moving a door provided on a sidewall of a refrigerated enclosure between a closed position and an opened position, the drive mechanism comprising:

a mount secured to the door;

an actuator operable to move the door, the actuator including a motor and a rod operably coupled to the motor and pivotally connected to the mount;

a first sensing device operably connected to the actuator and adapted to detect the door in the opened position and deactivate the actuator in the opened position of the door; and a second sensing device operably connected to the actuator and adapted to detect the door in the closed position and deactivate the actuator in the closed position of the door;

wherein the door includes a door frame defining an aperture, and an insulation member is positioned in the aperture such that the door frame surrounds the insulation member with exposed surfaces of the insulation member coplanar with outer and inner side surfaces of the door frame.

12. The drive mechanism of claim 11, further including a sleeve adapted to telescopically receive therein the rod, the motor connected to the sleeve.

13. The drive mechanism of claim 11, wherein the rod is a threaded rod and the motor is adapted to threadingly receive the threaded rod, the threaded rod is movable through the motor as the door is moved between the closed position and opened position.

14. The drive mechanism of claim 11 in combination with a refrigerated enclosure of a vending machine, the refrigerated enclosure including:

a housing having a sidewall with a sidewall opening;

the door mounted to the sidewall for selectively closing and opening the sidewall opening; and a door rail mounted to the sidewall and having a guide track, the door slidingly received in the guide track, the guide track adapted to first move the door in a first direction outwardly of the housing sidewall and then in a second direction along the housing sidewall.

15. The drive mechanism of claim 11 in combination with a vending machine, the vending machine housing a refrigerated enclosure for storing an associated pre-packaged food product, the refrigerated enclosure includes a housing having a sidewall with a sidewall opening, a door rail is mounted to the sidewall and has a generally L-shaped guide track, the door is slidingly received in the guide track for selectively closing and opening the sidewall opening.

* * * * *